No. 740,728. PATENTED OCT. 6, 1903.
R., S. H., M. L. G. E., M. H., S. H. & J. YOUDE.
POULTRY, GAME, OR BIRD REARING APPARATUS, PARTLY APPLICABLE TO HATCHING APPARATUS.
APPLICATION FILED OCT. 25, 1901.
NO MODEL. 7 SHEETS—SHEET 1.

No. 740,728. PATENTED OCT. 6, 1903.
R., S. H., M. L. G. E., M. H., S. H. & J. YOUDE.
POULTRY, GAME, OR BIRD REARING APPARATUS, PARTLY APPLICABLE TO HATCHING APPARATUS.
APPLICATION FILED OCT. 25, 1901.
NO MODEL. 7 SHEETS—SHEET 6.

No. 740,728. Patented October 6, 1903.

UNITED STATES PATENT OFFICE.

ROBERT YOUDE, SARAH H. YOUDE, MARY L. G. E. YOUDE, MARY H. YOUDE, SARAH H. YOUDE, AND JESSIE YOUDE, OF LIVERPOOL, ENGLAND.

POULTRY, GAME, OR BIRD REARING APPARATUS, PARTLY APPLICABLE TO HATCHING APPARATUS.

SPECIFICATION forming part of Letters Patent No. 740,728, dated October 6, 1903.

Application filed October 25, 1901. Serial No. 79,923. (No model.)

*To all whom it may concern:*

Be it known that we, ROBERT YOUDE, SARAH HANNAH YOUDE, MARY LILIAN GERTRUDE ELLISON YOUDE, MARY HELEN YOUDE, SARAH HANNAH YOUDE, and JESSIE YOUDE, subjects of the King of England, and residents of Stanley, Liverpool, in the county of Lancaster, England, have invented new and useful Improvements in or Connected with Poultry, Game, or other Bird Rearing Apparatus, Partly Applicable to Hatching Apparatus, of which the following is a specification.

This invention has reference to apparatus for rearing young chickens and other birds and for hatching same; and it has more particularly for its object and effect to generally improve apparatus of this kind, as hereinafter described, whereby (among other things) the proportion of chickens or young birds successfully reared by them shall be greater than that at present produced by the apparatus commonly employed and at the same time generally to provide better methods of or means for working and using such apparatus.

However, the invention has further objects and effects, as are hereinafter specified or comprised in the description of the several parts and characteristics of the invention.

The invention will be first described as applied to the rearing of chickens or young birds which, say, have been hatched from eggs in artificial hatchers or incubators.

In most cases the young birds may be taken from the incubator directly or soon after they are hatched and reared and cared for in this apparatus from this time to the time they are old enough to live without artificial warmth.

The invention will be described with the aid of the accompanying drawings.

In the drawings, Fig. 9 is an outside side elevation.

The bird-rearer shown in Figs. 1 to 5 will be first described. In this rearer the distance between the floor on which the birds walk and rest and the artificial warming device or vessel is expandible and adjustable, whereby as the birds grow the distance the heating vessel is above them may be made such that they get the required warmth as they grow—in fact while they are quite young and as they get older and bigger. In the drawings this floor is designated $a$ and the warming vessel $b$. The vessel $b$ is adapted to be raised or adjusted upward and downward mechanically by screws $b'$, operated by gearing above and working and meshing in nuts in the plate $b^2$, which is connected to the vessel $b$ by the suspension-bars $b^3$. The upper ends of the screw-rods $b'$ have spur-pinions $c$ fixed upon them, and these pinions mesh with a central operating spur-wheel $c'$, which is connected with and operated by the hand actuating-wheel $c^2$. The wheels $c'$ and $c^2$ are mounted on a central tubular column $d$, fixed on the bottom of the vessel $b$, and this tube constitutes also a ventilator to the space below the vessel. The tubular column $d$ and the screw-rods $b'$ are supported and guided at their upper ends by the frame $e$, forming a general roof to the chamber in which the heater $b$ is disposed. The ends of this chamber consist of plates $f$, secured to the ends of the roof $e$, from the lower part of which are suspended two flaps $f'$ $f^2$, $f'$ being supported from $f$ by suspension-hooks $f^3$ and the lower flap $f^2$ being supported from $f'$ by hooks $f^4$. There are two sets of these flaps $f'$ $f^2$ on either side of the center, their inner edges being some distance apart, leaving a space $f^5$ for the chicks to pass in and out. The frame or roof $e$ has wheels $e'$, which rest on rails $e^2$ on the upper edges of the stationary bars $g$, forming part of the sides of the apparatus. This construction enables the heater $b$ and parts connected with it and roof $e$ and ends $f$ to be moved longitudinally, as hereinafter described.

Figure 1:
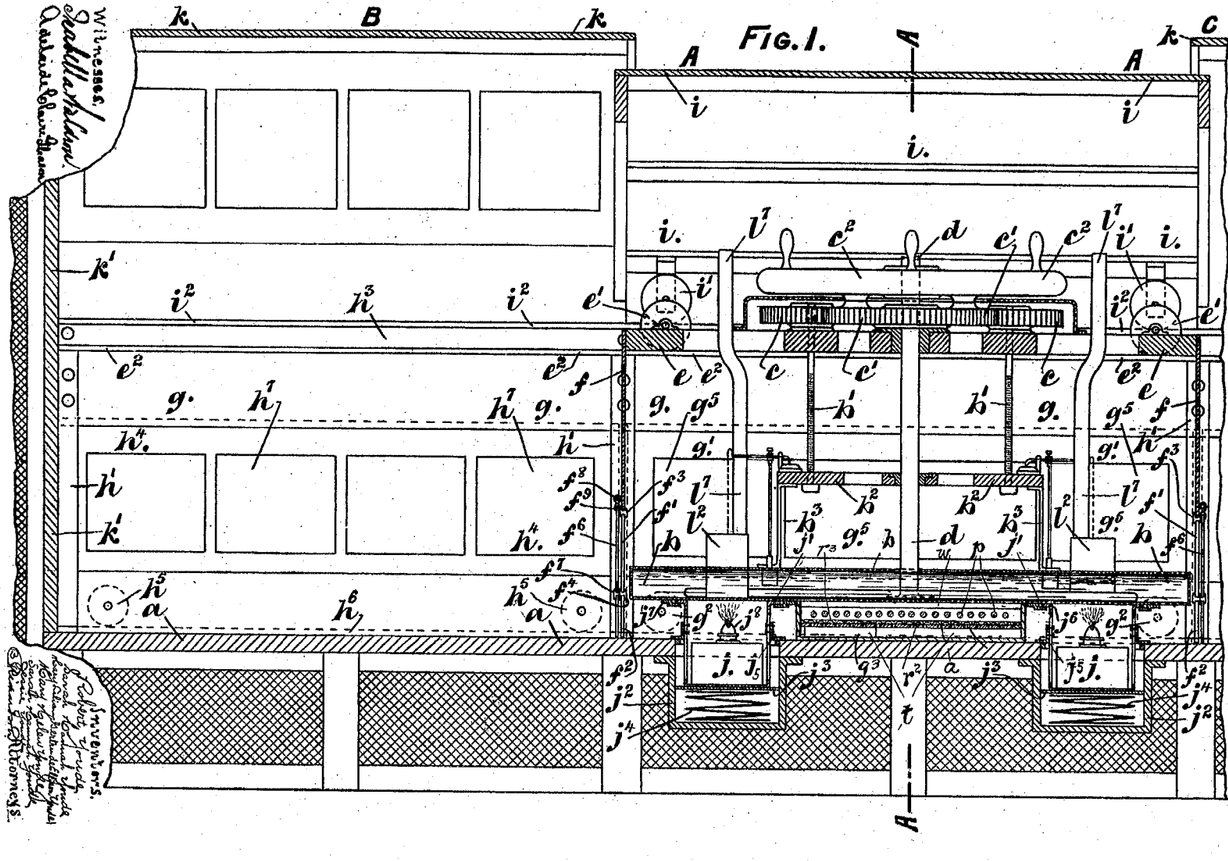
Figure 1 is a longitudinal section and Fig. 2 a cross-section at A A, Fig. 1, showing the general construction and arrangement of parts of the bird-rearer according to this invention.
Figure 2:
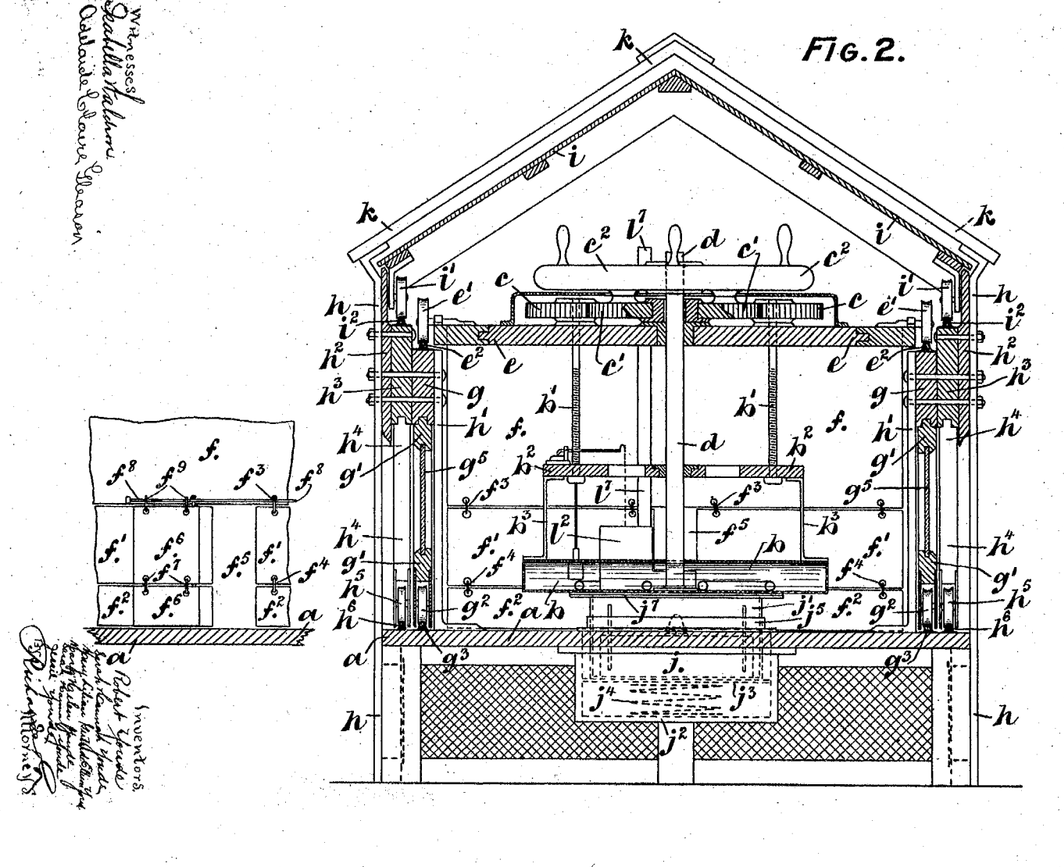

The flaps $f'$ $f^2$ at each end of the roof $e$ have connected with them a door $f^6$ in two parts connected together by links $f^7$, and this door is supported from a bar $f^8$ on the plate $f$ by links $f^9$, and upon this bar the door is adapted to be slid, so as to cover more or less or completely cover or uncover the ingress and egress aperture $f^5$, as required.

There are three sections or parts of the complete apparatus, which are generally designated A, B, and C; and the main sides of the frame of the apparatus, which are stationary, consist of upright metal bars $h$, upright internal metal bars $h'$, and wood longitudinal boards $h^2$, $h^3$, and $g$. Section A is that in which the heating apparatus is normally placed and the warmed rearing-chamber proper is located; but the roof $e$ and all the heating parts are capable of being moved longitudinally into section B or section C when desired, and the outer pitched roof proper, $i$, is also capable of being moved longitudinally into section B or section C, it being provided with wheels $i'$, which run on rails $i^2$ on the frame-boards $h^3$ for this purpose. The roof $i$ itself is made smaller than those of the sections C and B, which overlap it, to enable this to be done. The sides $g'$ of section A, below the boards $g$, are movable longitudinally, being supported by the wheels $g^2$ on their lower edges, which run on rails $g^3$, and they are guided at their upper edges by the boards $g$. The boards $g$ and the sliding parts $g'$ form the sides of the section A and are wholly disposed within the sides of the end sections B and C. The sides of these latter sections B and C are similarly formed to those of A—namely, they comprise the fixed boards $h^3$ at their upper part and the longitudinally-movable sides $h^4$, these sides $h^4$ having rollers $h^5$ running on rails $h^6$, their upper edges being guided by the boards $h^3$. Thus access can be had to the interior of the sections A, B, or C when desired by sliding these sliding portions $g'$ or $h^4$ longitudinally, and these side parts $g'$ and $h^4$ are provided with glass windows $g^5$ and $h^7$, respectively, to give light to the interior of the apparatus.

The body serving as the heating medium, as shown in the drawings, is adapted to be heated by oil-lamps $j$. These lamps $j$ are supported in cases $j'$, detachably secured on the vessel $b$, and these cases are disposed partly within the boxes $j^2$, fixed on the under side of the floor $a$. The bottom of the cases $j'$ rest on false bottoms or plates $j^3$, which are normally pressed upward by springs $j^4$, and when the lamps are raised up out of the boxes $j^2$ the plates $j^3$ are stopped from being pressed out of the lamp-apertures in the floor $a$ and held by suitable projections at the edges of these apertures, and thus they fill up the apertures and prevent the chicks tumbling into the boxes $j^2$.

When the lamps are in their normal position, the spaces between the floor-aperture and the lamp-cases $j'$ are covered by angle-bar rings $j^5$, carried by and adapted to slide loosely up and down on the case $j'$. These rings normally rest in the position shown—i. e., on the floor—so long as the lamp-cases $j'$ or the lower part of same are below the floor-level. The lamp-cases $j'$ at their sides are provided with flanges $j^6$, which work in slides $j^7$, fixed on the bottom of the vessel $b$. By this the cases $j'$, with their lamps, can be slid into position under the heater $b$ or taken away as and when desired, when the vessel $b$ is raised up and the cases stand above the floor-level.

When the heating vessel $b$ is raised to its highest position, the lamp-cases $j'$ will be clear and stand above the level of the floor $a$. In this condition of parts the vessel $b$ and roof $e$ and the parts connected with them can be moved bodily along the rails $e^2$ in one direction or the other into section B or C, and if this is done and the roof $i$ is also run along the rails $i^2$ under the fixed roof $k$ of sections B and C free access is had to the section A and its floor and also to the interior of one or other of sections B C. To gain access to the mechanism for raising or lowering the heater $b$ and lifting the lamp-cases out of their recesses or chambers, the roof $i$ is first run under one of the roofs $k$.

With regard to the heating-flues, regulators, and parts of the heating vessel or tank $b$ these will be now described.

Figure 3:
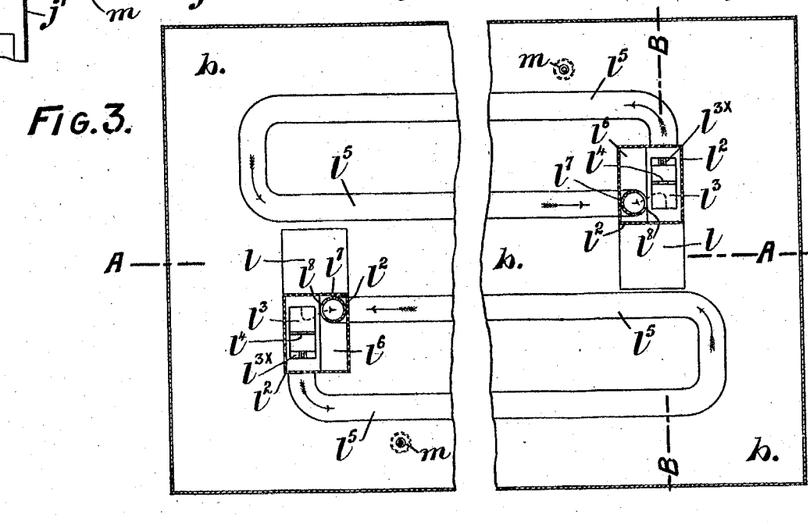
Fig. 3 is a plan in section of the heating apparatus of the rearer.
Figure 4:
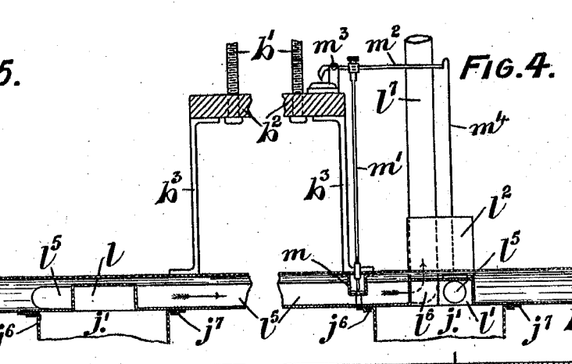
Figs. 4 and 5 are longitudinal section at A A and cross-section at B B, Fig. 3, of same.
Figure 5:
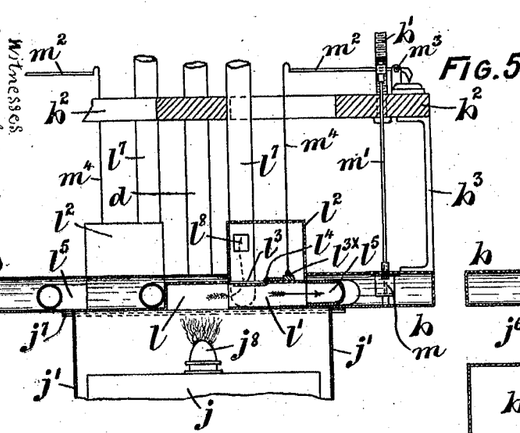
Figure 6:
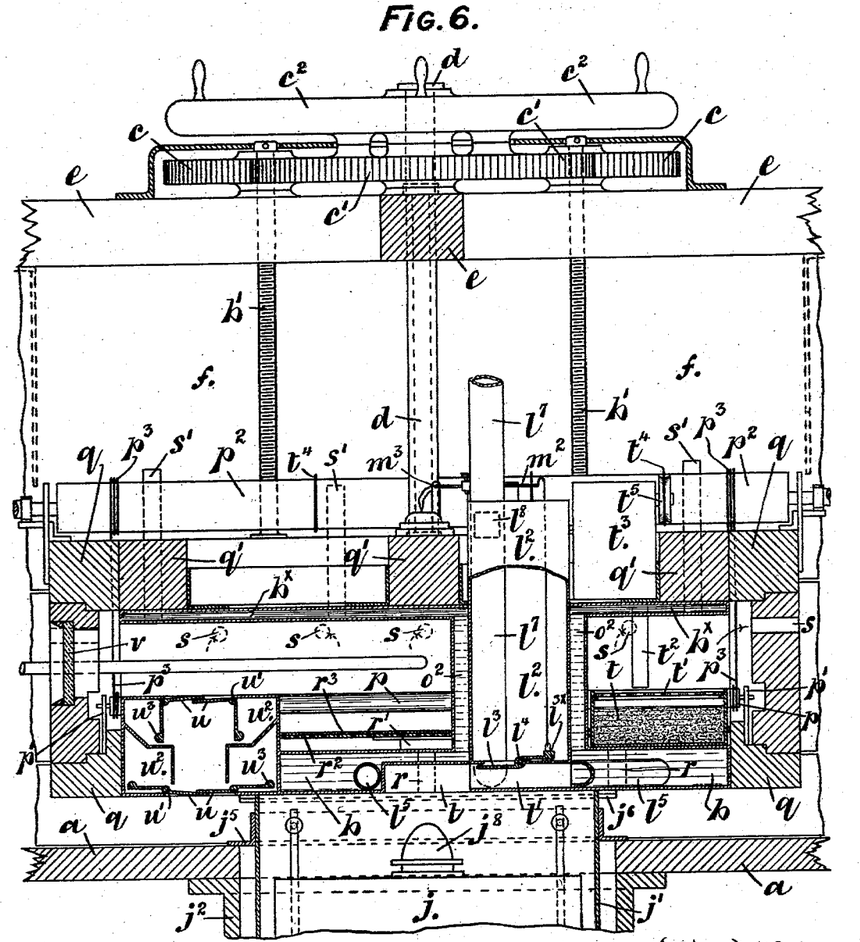
Fig. 6 is a transverse section showing a combined hatcher and rearer according to this invention.

In the water tank or vessel $b$, directly over the burner $j^8$ of each of the lamps $j$, there is a chamber or recess $l$, into which the products of combustion of the lamp directly pass, and this chamber is continued laterally and the gases pass from this recess $l$ directly to a passage $l'$, immediately above which there is a valve-box $l^2$, having a valve $l^3$, horizontally pivoted at $l^4$ on its floor and about which pivot it is adapted to move downward when it is desired to by-pass the products of combustion, so that its lower edge touches the bottom of the passage $l'$ and completely closes it. Normally, however, the valve $l^3$ is closed on the floor of box $l^2$, as in the position shown, and the gases of combustion pass from $l'$ directly into the flue-pipe $l^5$, which traverses a portion of the vessel $b$ and is immersed in the water therein. The other end of the pipe $l^5$ enters a closed chamber $l^6$, which is parallel with but separate from the passage $l'$, and passes up through the roof of this chamber into the box $l^2$ and then through the roof of this box and up through the apparatus and the roof $e$ of section A. This vertical portion is designated $l^7$ and constitutes a chimney. At a point within the box $l^2$ this pipe is provided with an aperture $l^8$, which is the gas-ingress to the pipe within the box $l^2$ when the valve $l^3$ closes the passage $l'$; but under normal conditions when the valve $l^3$ is closed the aperture $l^8$ performs no function.

When the apparatus is working under normal conditions—that is, when the heat of the water in the vessel $b$ is not excessive—the valve $l^3$ will be closed in the position shown in full lines in Fig. 5 by the heat-regulator or thermostat, as herein described, and the gases from the burner of the lamp $j$ pass along through passage $l'$, thence into the heating-flue $l^5$, and thence through the part of this pipe or flue in the chamber $l^2$, and finally up the chimney $l^7$, out into the upper part of the apparatus. When, however, the heat of the water in the vessel $b$ is above that required and the valve $l^3$ is moved about its hinge $l^4$ by the thermostat, so as to close the passage $l'$, the gases of combustion of the lamp pass directly from the chamber $l$ up through an opening in the floor of the box $l^2$ (normally covered by the valve $l^3$) and into the box $l^2$, whence they pass directly into the chimney $l^7$ through the entrance-aperture $l^8$ within this box. By the gases being so by-passed the temperature of the water in vessel $b$ will fall, and when it reaches the required degree the thermostat will again allow the valve $l^3$ to close the gas-passage to the box $l^2$ (a weight $l^{3\times}$ normally pressing this valve into this position) and reopen the passage $l'$.

Each of the heating-lamps has a heating system identical with that just described in connection with it and constitutes a separate and distinct heating system. The thermostat will be preferably of the well-known capsule type, (designated generally by the letter $m$,) and it acts on the valve $l^3$ through a rod $m'$, a lever $m^2$, connected to $m'$ and fulcrumed at $m^3$, and a connecting-wire $m^4$, connecting the free end of $m^2$ with the valve $l^3$.

With regard to the sections B and C the outer ends are inclosed by a wall $k'$, beyond which the usual "run" will be provided and which will be in communication with the space below the floor, which in itself constitutes a run for the chicks.

Figure 7:
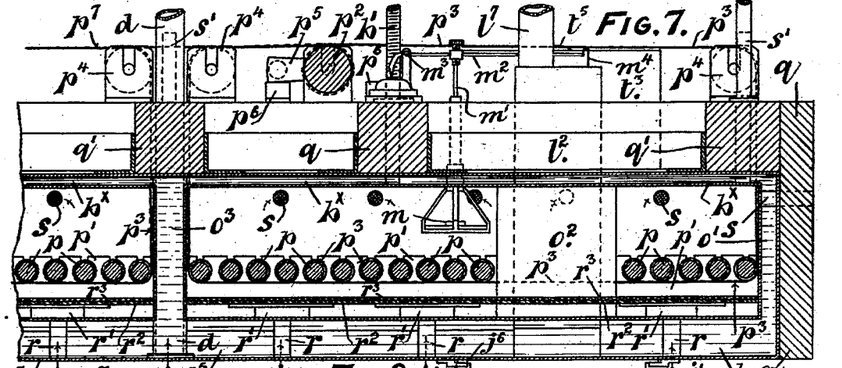
Fig. 7 is a longitudinal section.
Figure 8:
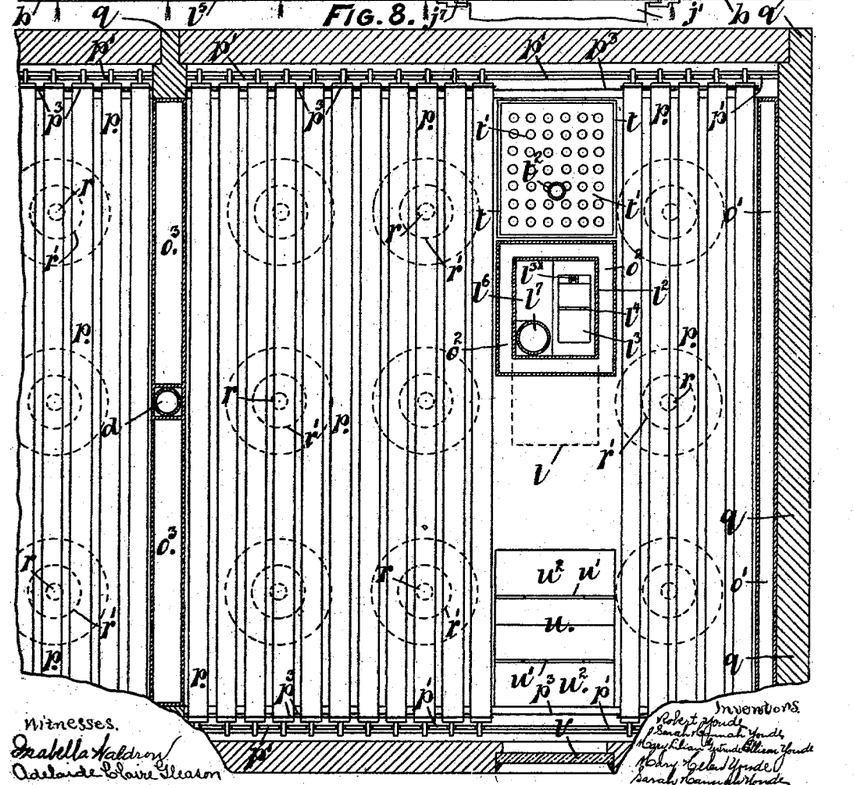
Fig. 8 is a plan in section through same.
Figure 9:
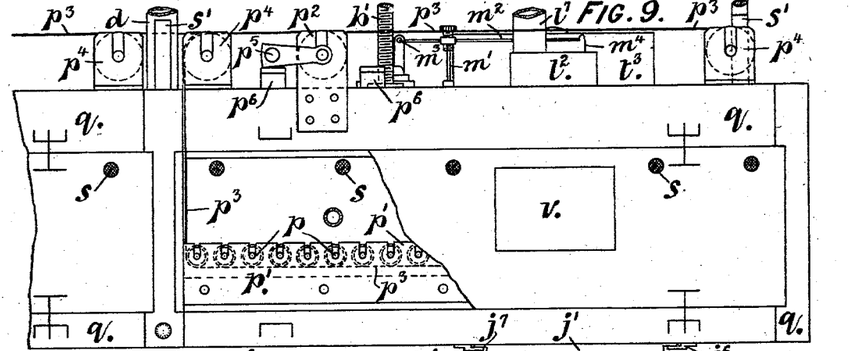
Figure 10:
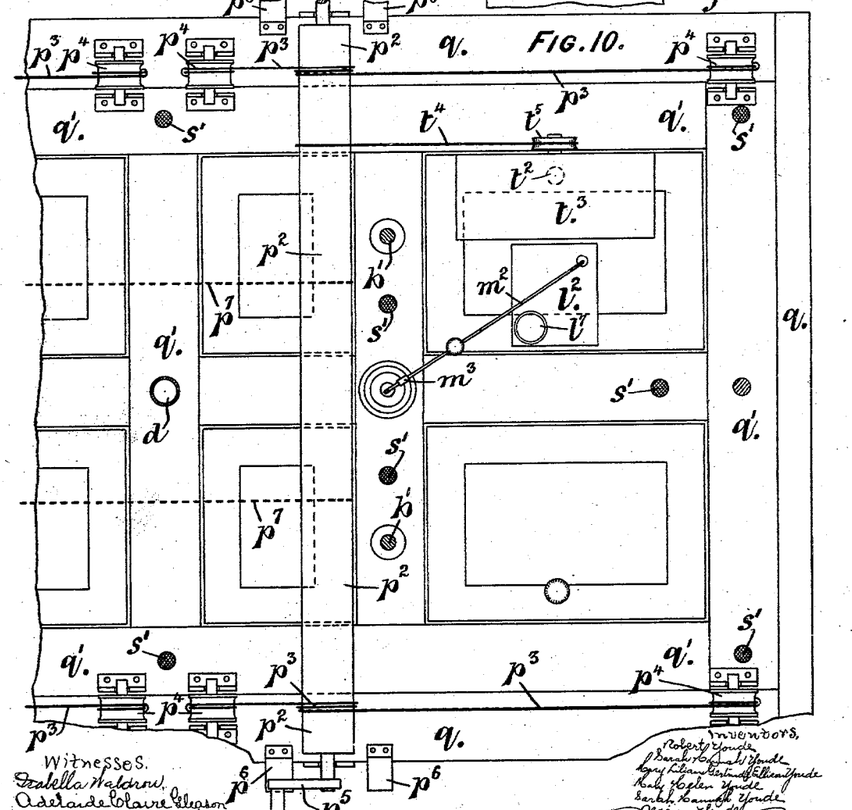
Fig. 10 is an outside plan, of the combined hatcher and rearer.

The combined rearer and hatcher illustrated in Figs. 6 to 10, inclusive, we now describe. Generally in these figures the same letters of reference are used to denote the same or similar parts which exist in the apparatus illustrated in Figs. 1 to 5. This apparatus comprises the heating vessel, which has heating lamps, chambers, and flues for the passage of the heating-gases identical with those set forth with reference to Figs. 1 to 5, and consequently description of these is not necessary. The water vessel in this case consists of mainly two parts—the lower part $b$ and an upper similar part $b^\times$. Between these two parts is a series of parallel rollers $p$ for supporting the eggs, and in connection with these rollers there is provided an operating-gear, an automatic trap mechanism for passing the hatched chicks from the hatching-space to the rearing-floor $a$ below the vessel $b$, and also an automatic water-supply for providing vapor to the hatching-chamber and the usual air-ventilators. The upper part $b^\times$ of the water vessel forms a heated roof to the hatching-chamber, and it is connected to the lower part $b$ by hollow walls $o'$, forming end water-communicating chambers between the vessels $b$ and $b^\times$. The vessels $b$ $b^\times$ are also connected by a vertical connection on water-wall $o^3$, forming a division in the center of the hatching-chamber, and by water-conduits $o^2$ around the gas-boxes $l^2$. The water is heated by the lamps $j$ and flues $l^5$ in the vessel $b$, as in the apparatus described with reference to Figs. 1 to 5, and it circulates from the vessel $b$ through the waterways or connections $o^2$ $o^3$ to the upper vessel $b^\times$ and back to $b$ by the end ways $o'$. The egg-carrying rollers $p$ are supported by plates or frames $p'$ at either side and running the whole length of the hatching-chambers, and they are driven by hand-actuated roller $p^2$, above the water vessel $b^\times$, and endless cords $p^3$, which pass around the rollers $p^2$, around pulleys $p^4$ at each angle of the hatching-chambers, and around the ends of each of the rollers $p$. The roller $p^2$ is given half a turn by a hand operating-crank $p^5$, which works between two stops $p^6$ on the frame of the apparatus. There is a complete set of these parts provided in connection with each end chamber; but the gearing is connected together by endless bands or cords $p^7$ passing from one roller $p^2$ to the other roller belonging to the other end chamber. By giving the crank $p^5$ half a revolution all the rollers $p$ will be revolved the required amount, and so turn the eggs over in the necessary way. All the parts above described of the hatching portion of this combined hatcher and rearer are inclosed in a wooden casing $q$ at the sides and ends, which is supported mainly by the open wooden frame $q'$ on the top of the upper water vessel $b^\times$. Air is supplied to the hatching-chamber by tubes $r$, extending through vessel $b$, which admit air onto the upper side of this chamber, and this air is diffused by the perforated rings $r'$, into which the air from the tubes $r$ passes, and by the perforated metal floor-plate $r^2$ and textile or cloth covering $r^3$ upon it. These air-inlets are distributed over the bottom of the apparatus, as shown in Figs. 7 and 8, and distribute the air under the floor $r^2$ and equally over the eggs by the perforated floor $r^2$ and cloth or textile covering $r^3$. The air in passing through the tubes $r$ and over the surface of the roof of the vessel $b$ is warmed prior to coming in contact with the eggs. The ventilation-outlets consist of the horizontal tubes $s$ in the upper part of the sides and ends of the hatching-chamber, they being covered with gauze to avoid draft, and also of vertical tubes $s'$, extending from the under side of the upper water vessel $b^\times$ through the top of the apparatus. These tubes $s'$ also serve as stop devices to the elevation of the heating appliances—namely, they are so disposed that they stand above the actuating rollers or parts $p^2$ and come in contact with the roof or frame $e$ of the apparatus in its upward movement by the raising and lowering gear, and so limit this movement. The elevating threaded rods $b'$ in this case are fixed at their lower ends to the frame $q$, while the bosses of the cog-wheel $c$ are internally threaded and mesh with the threads of $b'$, so that when they are turned they raise these rods and with them the combined hatching and rearing or heating parts up. To provide moisture to the atmosphere of the hatching-chamber, a vessel $t$ is provided in it, containing sand or analogous material and having a perforated cover $t'$, and to this vessel water is supplied by a pipe $t^2$ on a water-containing tank $t^3$, a certain quantity of water being supplied from this tank $t^3$ through the pipe $t^2$ to the sand by the actuation of the egg-turning roller $p^2$ through a band $t^4$, worked from this roller $p^2$ and driving a wheel $t^5$. By the contact of the air with the moistened or wet sand or material in the vessel $t$ it will become suitably moistened. The means of causing the young birds to automatically pass from the hatching-chamber to the rearing-chamber consists of two sets of double trap-doors $u$, hinged at $u'$ and disposed within a casing or chamber $u^2$, and a glazed window $v$ in the side of case $q$, immediately adjacent to these trap-doors. In action when the bird comes out of the shell it is attracted by the light from the window $v$ and walks onto the upper traps $u$, which are level with the rollers $p$, and by its weight these traps will be opened, and it will then fall onto the lower traps $u$, which will open similarly and discharge the bird onto the floor $a$. These traps are normally kept closed by their counterbalance-weights $u^3$, and being double they prevent any rush of air into the hatching-chamber. The birds fall onto the floor $a$ directly below the vessel $b$ and of course at once come under the warming influence of the vessel $b$ above them and are therefore commenced to be reared or brooded directly after they are hatched. The regulation of the temperature is effected in the same way as set forth with reference to Figs. 1 to 5, except that the capsule device $m$ is disposed within the hatching-chamber, and this will regulate the temperature within the hatching-chamber as well as that in the rearing-chamber under the vessel $b$.

Figure 11:
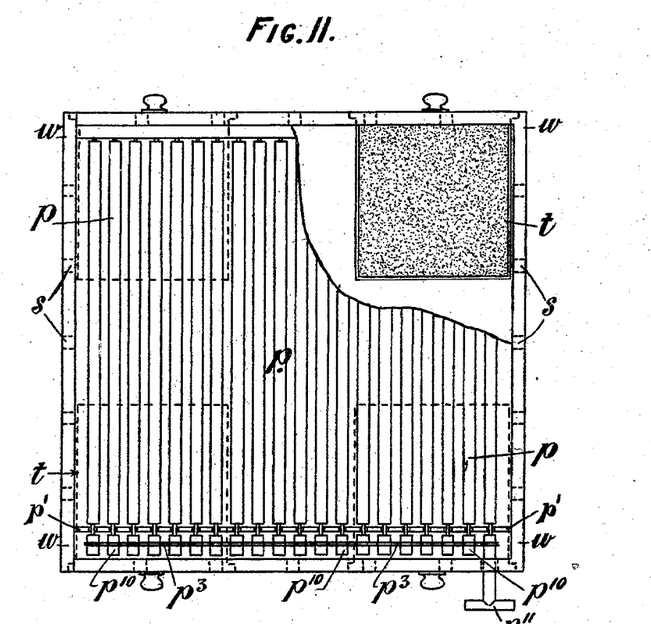
Figs. 11 and 12 are respectively plan and cross-section through a hatcher device adapted to be used in combination with the rearer shown in Figs. 1 and 2.
Figure 12:
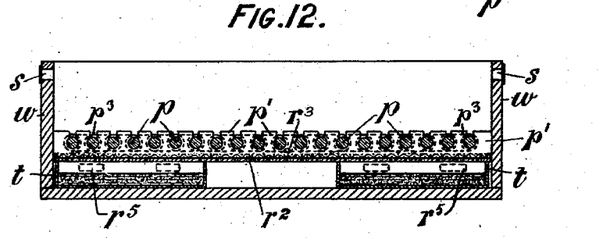

The construction of the combined hatcher and rearer, where the hatching portion is adapted to be used in connection with and under the vessel $b$, wherein the eggs are to be heated from above only, is illustrated in Figs. 11 and 12; but in general character the means of supporting and turning the eggs is the same as that substantially set forth with reference to Figs. 6 to 10. Referring to these Figs. 11 and 12, the hatching portion is in the form of a movable drawer or lidless box, (designated $w$,) in which the egg-supporting rollers $p$ are disposed. This box or drawer will fit under the vessel $b$ of Figs. 1 and 2, between the two lamp-cases $j'$, and by sliding the movable doors $g'$ or one of them out of way longitudinally in the manner above described this box or drawer $w$ can be slid into position under the vessel $b$ and taken out, the bottom of the vessel $b$ resting on the top of the box or drawer or being close to it. The rollers $p$ are rotated in this case by the cord $p^3$, passing around end rollers or pulleys $p^{10}$, outside their supporting plate or bearings $p'$, and by a handle $p^{11}$. Air is distributed to the eggs by perforated metal and cloth floors $r^2$, (shown in dotted lines in Fig. 12,) and the air passes to this distributing-floor through apertures $r^5$ in either end of the drawer or box $w$. This air also passes over sand or other material charged with water contained in the boxes $t$ in each corner of the drawer or box and becomes humidified. The outlets $s$ for air are disposed along the sides of the box at the top. In this case the chicks can be taken out by hand from the hatching drawer or box by raising the vessel $b$, and when they are taken out they are put on the floor $a$ and under the ends of the vessel $b$, so that they come under the influence of the rearer. The flaps on the end plates or walls $f$ of the hatching or rearing chamber prevent the birds being hurt when the heating apparatus and its carrying parts are moved into the chamber B or C.

What is claimed in respect of the herein-described invention is—

1. A bird-rearing apparatus comprising a floor $a$, on which the birds rest; a hollow heating vessel $b$ containing water above said floor, and constituting a heat-radiating roof; a heating-lamp attached to the under side of said vessel; a flue-pipe passing through the water of said vessel, through which the heating-gases from the lamp pass; means above said vessel and connected with same, for raising and lowering it in relation to the floor; and a thermostat located in the water of the vessel, and subject to the heat thereof for controlling the flow of heated products through the flue; substantially as described.

2. A bird-rearing apparatus comprising a floor on which the birds rest; an artificially-heated vessel or body above it, adapted to heat the backs of the birds; raising and lowering mechanism connected with and above said vessel or body for moving same vertically; a carriage above the vessel or body adapted to carry the raising and lowering means; and horizontal supporting-rails, adapted to support said carriage, and permit it to be moved longitudinally along said rails.

3. A bird-rearing apparatus comprising a floor on which the birds rest, an artificially-heated vessel or body above it, adapted to heat the backs of the birds, raising and lowering mechanism connected with and above said body or vessel for moving said vessel vertically; a carriage above the vessel or body adapted to carry the vertical adjusting means, horizontal supporting-rails, adapted to support said carriage; and end walls supported from said carriage, inclosing the heating vessel or body and rearing-chamber, and adapted to be moved with said carriage and vessel or body; substantially as described.

4. A bird-rearing apparatus comprising a floor on which the birds rest; an artificially-heated vessel or body above it, adapted to heat the backs of the birds; raising and lowering mechanism connected with and above said body or vessel for moving said vessel vertically; a carriage above the vessel or body adapted to carry the vertical adjusting means and horizontal supporting-rails, adapted to support said carriage; and wheels supported on the carriage adapted to run on the rails; substantially as described.

5. A bird-rearing apparatus comprising a floor on which the birds rest; and an artificially-heated vessel or body above it, adapted to heat the backs of the birds, said heating body or vessel being vertically adjustable in relation to the floor, whereby the vertical distance above said floor can be increased and varied; raising and lowering means connected with said vessel or body, for moving it vertically up and down; a carriage above said vessel carrying the adjusting mechanism; longitudinal rails supporting said carriage, on which it can be moved longitudinally; a longitudinally-sliding roof $i$ over said carriage and parts, having suppporting-wheels $i'$; and rails along which said roof-wheels are adapted to run; substantially as described.

6. A bird-rearing apparatus comprising a floor on which the birds rest; an artificially-heated vessel or body above it, adapted to heat the backs of the birds, raising and lowering mechanism connected with said heated vessel or body; a roof above said vessel or body; and vertical walls $f$ connected with the end of said roof, having loosely-suspended lower portions, said walls $f$ and suspended parts forming the end to the rearing-chamber; substantially as described.

7. A bird hatching and rearing apparatus, comprising an artificially-heated vessel or body above the floor; raising and lowering mechanism connected with said vessel or body for adjusting it vertically; egg-supporting rollers above, and connected with, and adapted to be moved with said vessel or body; a casing inclosing said rollers; and an automatic trap connected with said rollers, for allowing the hatched birds to fall down, and beneath the said heating vessel or body; substantially as described.

8. A bird hatching and rearing apparatus comprising an artificially-heated vessel or body above the floor; raising and lowering mechanism connected with said vessel or body for adjusting it vertically; egg-supporting rollers above and adapted to be moved with said vessel or body; a casing inclosing said rollers; an automatic trap connected with said rollers for allowing the hatched birds to fall down and beneath the said heating vessel or body; and a window adjacent to said trap for attracting the birds on to said trap; substantially as described.

9. A bird hatching and rearing apparatus, comprising an artificially-heated vessel or body above the floor; raising and lowering mechanism connected with said vessel or body for adjusting it vertically; egg-supporting rollers above and adapted to be moved with said vessel or body; a casing inclosing said rollers; an external actuated roller; and an endless operating-cord passing over same, and the egg-supporting rollers, for operating same, and turning the eggs; substantially as described.

10. A bird hatching and rearing apparatus, comprising an artificially-heated vessel or body above the floor, consisting of two parallel portions one above the other; raising and lowering mechanism connected with said vessel or body for adjusting it vertically; egg-supporting rollers within the space between said two parallel portions of the said vessel or body, and adapted to be moved with same; and a casing inclosing said rollers; substantially as described.

11. In a bird rearing or hatching apparatus, the combination of floor $a$; a heating vessel $b$, filled with water and adapted to be heated artificially; a roof $e$, above said vessel; winding mechanism carried on said roof $e$, and connected with the vessel $b$, and adapted to raise and lower same; substantially as described.

12. In a bird rearing or hatching apparatus, the combination of floor $a$; a heating vessel $b$, filled with water and adapted to be heated artificially; a roof $e$ above said vessel; a plurality of toothed wheels on said roof; actuating means also supported by said roof $e$, and adapted to actuate said toothed wheels; and a vertical screw-threaded rod, connected with each of said toothed wheels and the vessel $b$, and adapted to raise and lower same when they are revolved by said actuating means; substantially as described.

13. In a bird rearing or hatching apparatus, the combination of floor $a$; a heating vessel $b$, filled with water, and adapted to be heated artificially; a roof $e$, above said vessel; winding mechanism carried by said roof $e$, and connected with the vessel $b$, and adapted to raise and lower said vessel; side walls comprising portions $g$ and moving portions $g^5$; and end walls $f$, having freely-suspended lower portions, and connected with and supported from said roof $e$; substantially as described.

14. In a bird rearing or hatching apparatus, the combination of floor $a$; a heating vessel $b$, filled with water and adapted to be heated artificially; a roof $e$, above said vessel; winding mechanism carried by said roof $e$, and connected with the vessel $b$, and adapted to raise and lower said vessel; and a lamp $j$ carried by said vessel $b$, on its under side, and adapted to move with same; substantially as described.

15. In a bird rearing or hatching apparatus, the combination of floor $a$; a heating vessel $b$, filled with water and adapted to be heated artificially; a roof $e$, above said vessel; winding mechanism carried by said roof $e$, and connected with the vessel $b$, and adapted to raise and lower said vessel; a detachable lamp-case $j'$ carried by said vessel $b$ on its under side, and adapted to move with same; a lamp $j$ carried by and in said lamp-case; and a box $j^2$ fitted in the floor $a$, in which said lamp-case $j'$ is disposed and works; substantially as described.

16. In a bird rearing or hatching apparatus, the combination of floor $a$; a heating vessel $b$, filled with water and adapted to be heated artificially; a roof $e$, above said vessel; winding mechanism carried by said roof $e$, and connected with the vessel $b$, and adapted to raise and lower said vessel; a lamp $j$ carried by said vessel $b$, on its under side, and adapted to move with same; a flue $b^5$ for the heating-gases in said vessel; a chimney $l^7$; a valve $l^3$ for controlling the flow of heating-gases either through said flue or direct to said chimney; and a thermostat connected with said vessel, and with the valve for operating same; substantially as described.

17. In a bird rearing or hatching apparatus, the combination of the floor $a$; a water-filled heating vessel comprising lower and upper parallel portions $b$ $b^\times$, communicating with one another, and adapted to be heated artificially; a casing about the sides and top of said vessel; and raising and lowering mechanism connected with same for moving it vertically in relation to the floor $a$; substantially as described.

In witness whereof we have hereunto set our hands in presence of two witnesses.

ROBERT YOUDE.
SARAH H. YOUDE.
MARY L. G. E. YOUDE.
MARY H. YOUDE.
SARAH H. YOUDE.
JESSIE YOUDE.

Witnesses:
JOHN HINDLEY WALKER,
LEONARD SRAWLEY.